United States Patent [19]
Taylor

[11] 3,859,174
[45] Jan. 7, 1975

[54] RECOVERY OF POTABLE WATER FROM SANITARY WASTE USING SOLID WASTES AND REFUSE AS A HEAT SOURCE

[76] Inventor: Fred W. Taylor, P.O. Box 918, Bartow, Fla. 33830

[22] Filed: Nov. 14, 1972

[21] Appl. No.: 306,383

[52] U.S. Cl. ............... 203/10, 110/8 C, 159/1 RW, 209/11
[51] Int. Cl. ............................................. B01d 3/00
[58] Field of Search ........... 203/10, 90, 11; 201/2.5, 201/29; 159/16, 4 A, 4 C, 1 RW; 202/236, 176, 180, 234, 182; 110/8 C

[56] References Cited
UNITED STATES PATENTS

| | | | |
|---|---|---|---|
| 2,151,079 | 3/1939 | Bowen | 159/1 RW |
| 2,756,029 | 7/1956 | Brogdon | 159/16 A |
| 2,764,234 | 9/1956 | Rauh | 159/16 A |
| 3,127,243 | 3/1964 | Konikoff | 201/2.5 |
| 3,242,058 | 3/1966 | Ganley et al. | 203/10 |
| 3,257,290 | 6/1966 | Starmer | 202/180 |
| 3,396,514 | 8/1968 | Hurst et al. | 159/4 A |
| 3,405,454 | 10/1968 | Zeff | 203/DIG. 5 |
| 3,425,914 | 2/1969 | Kanaan | 202/236 |
| 3,432,399 | 3/1969 | Schutt | 159/16 A |
| 3,444,051 | 5/1969 | Popma et al. | 202/182 |
| 3,467,587 | 9/1969 | Connell et al. | 159/1 RW |
| 3,480,513 | 11/1963 | Martin | 202/234 |
| 3,649,469 | 3/1972 | MacBeth | 203/10 |
| 3,725,205 | 4/1973 | Heen | 202/176 |

Primary Examiner—Wilbur L. Bascomb, Jr.
Assistant Examiner—Frank Sever
Attorney, Agent, or Firm—Cushman, Darby & Cushman

[57] ABSTRACT

A process and apparatus for disposing of solid wastes, for disposing of sanitary waste waters, and for producing potable water, is disclosed, wherein solid wastes are incinerated and the heat generated during incineration is used to evaporate sanitary waste waters. Contaminated waters are first used as cooling water and then atomized into the gas stream coming from the incinerator to cool the combustion gases and evaporate the water in the contaminated water. Solid are removed from the gas stream, which also contains water vapors, and then the gases are cooled to condense the water vapors, which is suitable for use in a city water supply system.

14 Claims, 4 Drawing Figures

RECOVERY OF POTABLE WATER FROM SANITARY WASTE USING SOLID WASTES AND REFUSE AS A HEAT SOURCE

BACKGROUND OF THE INVENTION

As solid wastes can no longer be ignored or dumped into the nearest ravine, solid waste disposal has recently become of major interest, and has developed into a major problem, for many municipalities. Surveys indicate a current solid waste generation rate of over 5 pounds per person per day, and this rate is increasing at an annual rate of about 4 percent. Thus, by the year 1990 this figure could reach about 12 pounds per person per day.

Solid waste disposal by land fill must be such that no seepage or run-off of decomposing garbage contaminates lakes or streams near the filled area. For this reason, low-lying swampy land in the existing water table is generally unsuitable for solid waste land-fill disposal. The value of high, well drained land has increased to the point where the use thereof for solid waste landfill disposal is generally prohibitive.

Incinerators have been used in North America and Europe for a number of decades, generally solely for the disposal of solid wastes. The incinerators previously used generally resulted in substantially atmospheric pollution and, as far as is known, no previous attempts have been made to recover water from the incinerator combustion gases.

Incineration generally reduces the volume of solid waste by about 90 percent. The iron in the remaining 10 percent solid waste residue is often recovered and recycled to a steel mill. The solid waste residue from the incinerator may contain about 50 percent of a glass fraction, and this glass fraction may be recovered, crushed and, after suitable treatment, used for sand aggregate in concrete mixes or used for road fill.

The water-carriage system of sewage disposal is a simple and economical manner of removing offensive and potentially dangerous wastes from household, commercial and industrial sources. Surveys indicate that in 1968 the national average sanitary waste water generation was about 80 gallons per capita. This sanitary waste water generation is, however, increasing. The sanitary waste water is collected at a sewage treatment plant that separates organic material and dissolved solids and attempts to kill disease germs. The sewage treatment plant attempts to lower the biological oxygen demand of the waste affluent and to produce an effluent which is somewhat suitable for discharge into rivers and streams. The cost of removing or neutralizing polluting material increases rapidly if complete removal is attempted. Sewage treatment processes have evolved gradually from removing coarse and suspended matter only to primary treatments, then secondary treatments, and finally various state and Federal governments are demanding third stage treatment to substantially remove all polluting materials. This third stage treatment is a very difficult goal to achieve by mechanical or chemical treatment methods. Mechanical and chemical treatment methods produce a sediment or sludge which must be treated, handled, and finally disposed of. The clarified effluent is normally discharged to rivers or streams.

In recent years increased populations and increased water usage have resulted in liquid sanitary waste water treatment plants operating at or above capacity, and serious environmental pollution has often resulted.

In addition to the solid waste problem and the sanitary waste water problem mentioned above, municipalities have also been faced with a reduced supply of potable water. Populations have expanded with congregation in densely populated areas. Many modern conveniences have been developed, such as dishwashers, washing machines, showers, toilets and the like, which depend upon a clean water supply for their operation. As a result, water usage has steadily increased to a level estimated at 100 gallons per capita in 1968, and it is estimated that by 1975 the usage in some cities will be up to 125 gallons per capita. The amount of rainfall available as a source of potable water is definitely limited in most areas, and the constantly increasing demand of cities for water will ultimately exceed the amount of fresh water available. At the point, additional sources of water must be sought, or better water conservation must be observed. An obvious additional source of water for many coastal locations is brackish water or even salt water from bays or oceans, but most systems proposed to recover potable water from these sources have been economically unfeasible.

SUMMARY OF THE INVENTION

Process and apparatus are provided to produce clean, safe potable water, to dispose of water-borne sanitary waste, to dispose of solid wastes, and optionally to recover clean, safe potable water from contaminated surface water, salt water, fresh water having a high solids content, or the like. The solid waste material is incinerated and the heat generated is used to evaporate sanitary waste waters. Contaminated waters are first used as cooling water and then atomized into the incinerator gas stream whereby the combustion gases are cooled and the water in the sanitary waste/contaminated water mixture is evaporated. Solids are removed from the combustion gas/evaporated water gaseous mixture and then the gases are cooled to condense at least most of the water therein. The condensed water is aerated and cooled and passed to the city water supply system, and combustion gases are passed to the atmosphere. The process is designed to provide daily requirements for water and sanitary waste and solid waste disposal. For instance, the process can provide a 100 gallons per capita per day of clean, pure, distilled drinking water, can dispose of organic solids and recover 80 gallons per capita per day of distilled drinking water from sanitary waste, can provide 20 gallons per capita per day of clean, pure, distilled water from salt water or contaminated surface water or the like, and can dispose of 5 lbs. of solid waste per capita per day by incineration, with optional recovery of valuable material in the incinerator residue.

DETAILED DESCRIPTION OF THE INVENTION

The present invention relates to a system of disposing solid waste and sanitary waste, with recovery of clean, pure, distilled drinking water from the system in an amount such as to supply all or part of the potable water demand of a given community.

Solid wastes are collected and stored according to conventional methods. The solid waste is incinerated, preferably on an inclined hearth using a jet pulse air firing system, although continuous grate, or other conventional incinerator arrangements, may be used if desired. In some instances, it may be desirable to add up to 500 percent by weight of coal to the solid wastes to reduce the demand for other types of fuels. The density of the solid waste determines the bed depth in the incinerator, with the bed depth also being controlled by the firing rate. The incinerator preferably operates at about 1,400°F. With cast iron grates, generally significant problems occur at incinerator temperatures of 1,800°–1,900°F or more, but incinerator temperatures of as high as 2,800°F may be used with the preferred jet air pulse grate. Generally the incinerator temperature will be at least 1,300°F but care must be taken to avoid problems with odors and incomplete combustion if relatively low incinerator temperatures are used. The incinerator temperature is conventionally controlled by controlling the amount of air introduced into the incinerator, as known to the art. The air may be introduced above the grate "overfiring" or from underneath the grate "underfiring". However, it is preferred to use a combination of overfiring and underfiring to achieve complete combustion of the combustible material in the solid waste. An overfiring-air/underfiring-air ratio of 60/40 has been found to be particularly desirable, although this ratio may vary considerably according to the operating conditions of the incinerator.

The incinerator is desirably operated to have as complete combustion as possible of the solid waste. Generally, the combustion will be at least 80 percent by weight of the combustible material in the solid waste, preferably at least 90 percent, and more preferably in excess of 95 percent. As mentioned above, it may be desirable, in some instances, to add up to 500 percent by weight of coal to the solid waste. The use of bituminous coal for mixing with the solid waste will often result in a substantial savings in the fuel costs of the incinerator plant operation. Natural gas, fuel oil and electric power are generally considerably more expensive than bituminous coal, especially bituminous coal having a high sulphur content. This coal can simply be mixed with the solid waste and burned on the incinerator grate.

If the coal has a high sulphur content, sulphur dioxide gas ($SO_2$) will be produced by the burning coal. If the atomizing aqueous liquid contains salt water or brackish water, the sodium chloride may react with the $SO_2$ to form sodium sulphate ($NaSO_4$) in the form of a dry powdery precipitate, which can be collected by the dust bag collector. Some sodium sulphate may react with calcium carbonate in the sanitary waste to form hydrogen chloride, which will then be converted into calcium chloride, which also precipitates as a dry powder which is collectable in the dust bag collector. In some instances, the atomized aqueous liquid may not contain sufficient calcium carbonate or calcium oxide to neutralize the hydrogen chloride involved in the above reaction. In such a situation, lime (CaO) may be added to the atomizing aqueous liquid in quantities sufficient to neutralize the hydrogen chloride, to insure that the gases discharged from the process of the present invention meet all federal and state antipollution requirements.

The solid residue remaining after combustion of the solid waste, e.g., the non-combustible material in the solid waste, are dropped into a quench tank to quench the temperature thereof to a level such that the quenched material may be subsequently handled and processed. Generally, the temperature of the quenched residue will be below 212°F, preferably below 180°F. The quenched solid waste residue may be used as such for land fill or the like, or may be subjected to various separations to remove valubale components therefrom. Preferably, the quenched residue is sized to remove oversize particles therefrom, and then the remaining material is crushed to an average maximum particle size of less than one-fourth inch. Ferromagnetic material is separated from the residue, using conventional separation equipment, and then the non-ferromagnetic material may be separated into various fractions by a hydraulic classifier, or other separating means, as known to the art.

The gases produced from the burning of combustible material on the incinerator grate may be subjected to an afterburning operation, in order to insure that all combustible particles and odors in the gases are completely consumed. Gas burners are conveniently used in the afterburner, although other means of supplying heat may obviously be used, including the waste gases, say at a temperature of about 950°C, from a turbo jet engine coupled to an electrical generator (in such an instance, the plant would also supply all or part of the electrical energy requirements of the community). Such waste gases may also be used in the main incinerator as a source of heat.

The combustion gases are then passed through a venturi throat, wherein an aqueous slurry or solution is atomized into the gas stream, evaporating the water and dropping the temperature of the gas stream to 275° – 350°F, preferably about 300°F, although even higher temperatures may be utilized in some operations. If the temperature dropped significantly below 300°F, water vapor may start condensing, and at temperatures significantly above 300°F, the loss of heat in the incinerator gases may be significant. The cooled combustion gases from the incinerator, containing the atomized aqueous slurry or solution therein, are passed through a spray dryer to remove the solid materials from the gas stream. Any solid materials fall to the bottom of the dryer hopper and are discharged from the system for subsequent disposal. The gases passing through the spray dryer are passed through a dust bag collector or the like to remove any entrained particles therefrom. Instead of a dust bag collector, a cyclone or an electrostatic precipitator may be used, as will be clear to the art. The entrained particles removed by the dust bag collector or similar apparatus is removed from the system for subsequent disposal.

The gases passing through the dust bag collector are then introduced into a heat exchanger wherein the gases are cooled by indirect heat exchange with an aqueous medium. The water vapors in the gas stream condense and are collected in an air-water separator after being discharged from the heat exchanger. Generally, the gases discharged from the heat exchanger are cooled to a temperature of 70° – 180°F, preferably about 90°F. Various types of heat exchangers may be utilized, but a tube and shell arrangement has been found preferred. The heat exchanger disclosed in U.S. Pat. No. 3,414,483 may be conveniently used.

After being separated from the cooled combustion gases, the condensed water flows to a seal tank and is then aerated and cooled to about ambient temperatures. The aeration adds oxygen to the water, which is generally desired for taste reasons. The aerated, cooled water is then sent to the city water water supply system.

The liquid medium which is used in the heat exchanger is sanitary waste collected by the city sewer system, optionally mixed with up to 25 percent by weight of make-up water. The make-up water may be salt water, brachish water, contaminated surface water, or the like. The sanitary waste and the make-up water, if used, are screened to remove any large particles therefrom and are then mixed together and supplied to the cold side of the heat exchanger.

After being used to condense water in the combustion gases in the heat exchanger, the aqueous medium is atomized in the venturi throat described above.

In a preferred form of heat exchanger, the vapors which are generated from the aqueous medium in the heat exchanger are removed from the heat exchanger, compressed to about the water vapor saturation temperature, and discharged into the gas stream introduced into the hot side of the heat exchanger.

The gases passing through the air-water separator on the discharge end of the heat exchanger are discharged to the atmosphere, preferably after having first passed through a mist eliminator.

DESCRIPTION OF THE DRAWINGS

The invention will be understood more readily with reference to the accompanying drawings wherein

FIG. 1 illustrates a block flow diagram of a combined process for supplying the potable water requirements, disposing of sanitary wastes and disposing of solid wastes from a community having a population of 1,000 persons. The national average wastes produced are 80 gallons of sanitary waste waters per capita per day and 5 lbs. of solid waste per capita per day. The national average clean water requirement is 100 gallons per capita per day. The process illustrated in FIG. 1 disposes of sanitary wastes and solid wastes, without substantial environmental pollution, while providing the potable water requirements for the community.

The indicated amounts of water, air, solid wastes and sanitary wastes are supplied to the incinerator, wherein the combustible material in the wastes is fired to produce the indicated amount of incinerator gases having a temperature of 1,400°F and a small amount of solid residues. In the incinerator afterburner of combustion chamber, additional air is introduced, together with natural gas, and burned, vaporizing any remaining water entrained in the incinerator gas and producing the indicated amount of gas having a temperature of about 1,400°F. This gas is introduced into a spray dryer, wherein the indicated amount of water-solid mixtures is atomized into the gas stream. The gas is cooled to a temperature of about 300°F, and a small amount of solids are recovered in the spray dryer. The gases are passed through a dust bag collector and into a heat exchanger wherein they are cooled by heat exchange with a water-solids mixture having a temperature of 70°F. Some of the water in the water-solids mixture is vaporized, and these water vapors are compressed and then supplied to the other side of the condenser, wherein they are used to evaporate additional water vapors from the water-solids mixture. The water vapors in the spray dryer gasses are condensed, along with the compressed water vapors from the heat exchanger, producing the indicated amount of distilled water at a temperature of about 90°F.

Figure 1:
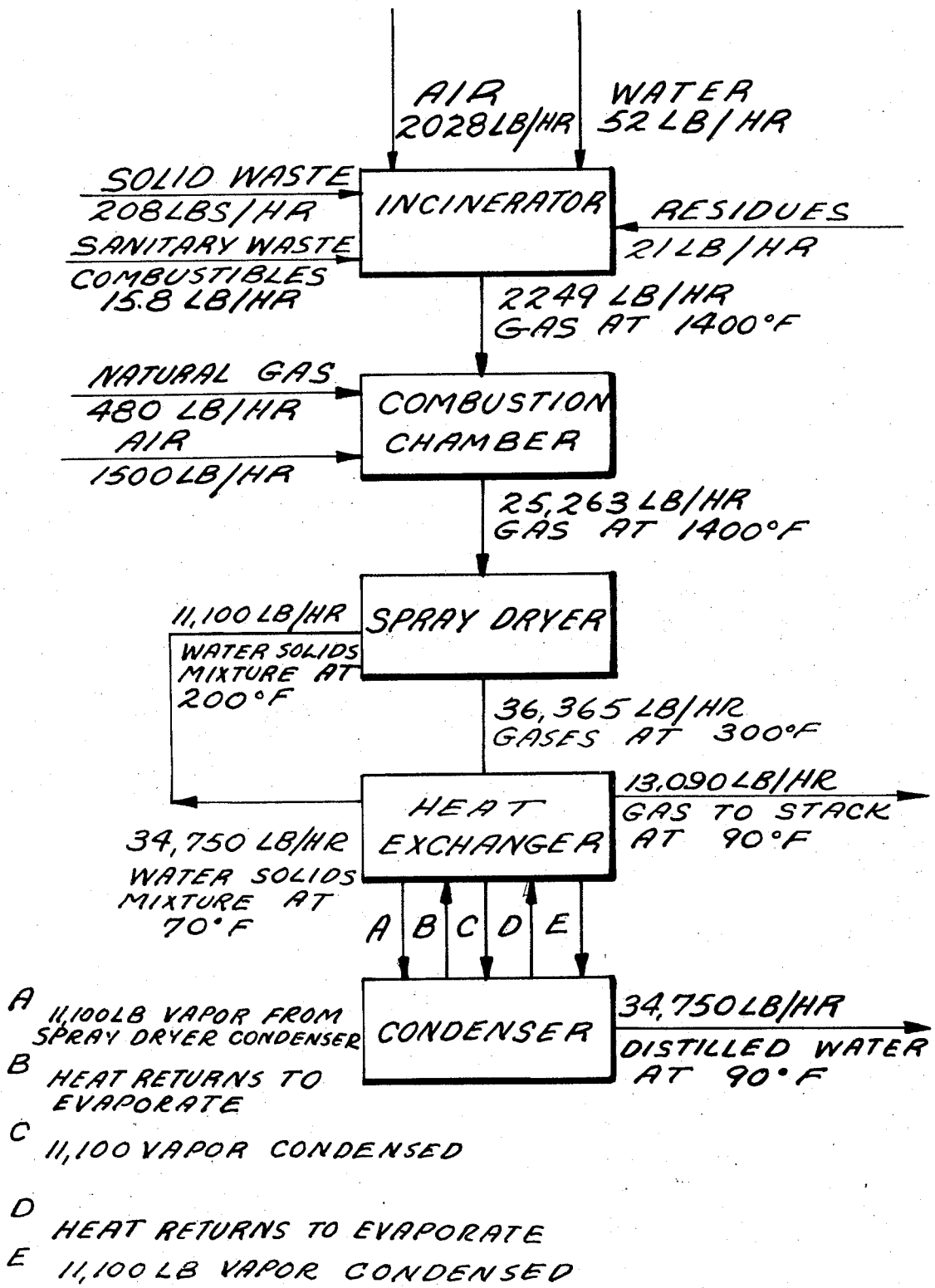
FIG. 1 represents a block flow diagram of the process of the present invention.
Figure 2:
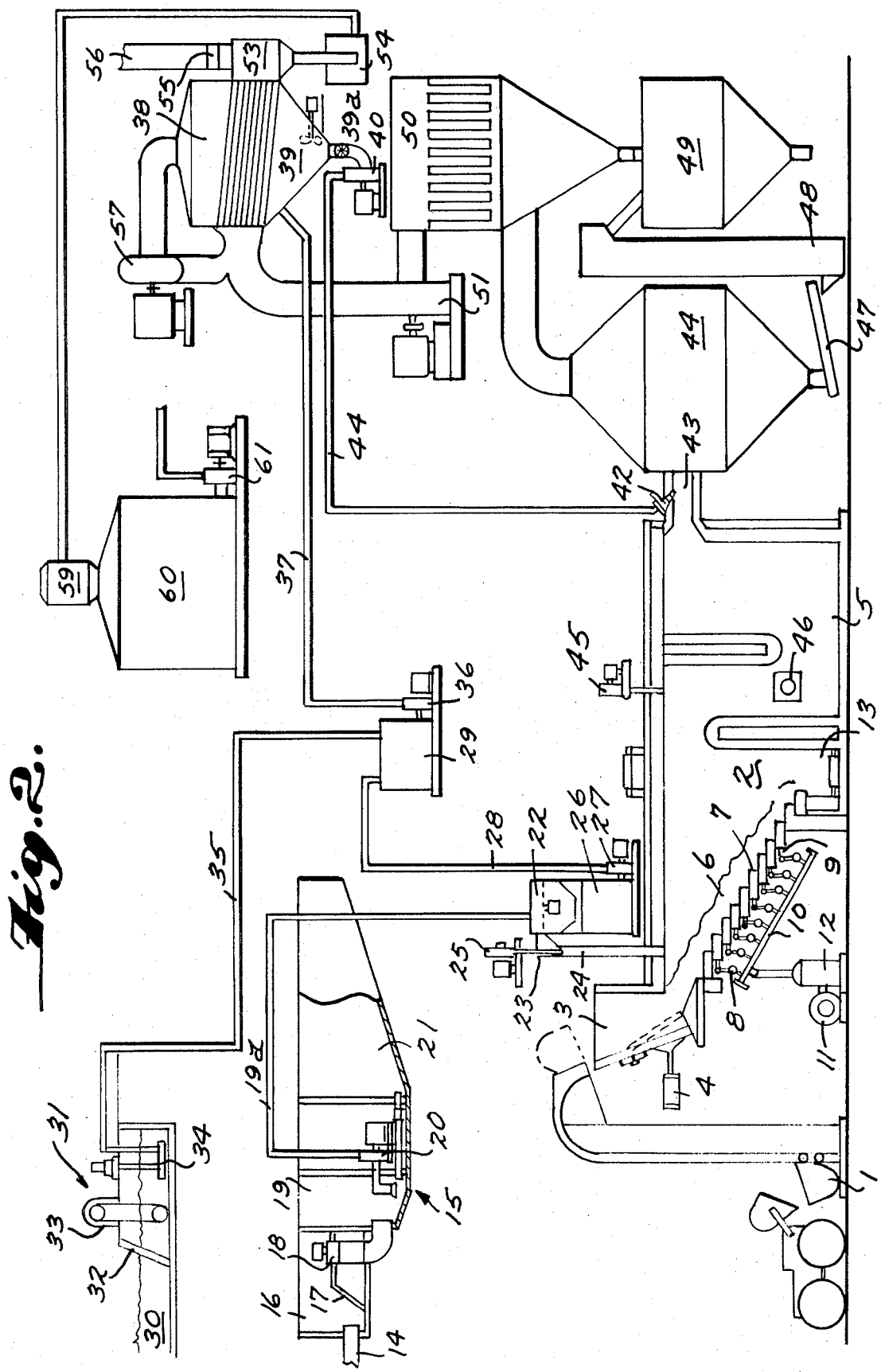
FIG. 2 represents a schematic process diagram of the present invention, except for the incinerator quench tank and associated solid waste treatment apparatus.

FIG. 2 is a schematic process diagram of the apparatus of the present invention for providing drinking water and treating sewage and solid wastes.

Solid wastes are collected from residential, commercial and/or industrial sources and delivered to the plant of FIG. 2 by community waste collection crews. The wastes may be weighed and stored inside of a solid waste storage building (not shown) from which the wastes are transported, as needed, into the lifting bucket of skip hoist 1 of incinerator 2. The skip hoist 1 feeds the wastes to raw feed hopper 3, from which the wastes are forced into incinerator 2 by ram plate feeder 4. The ram plate feeder 4 has a variable speed control on its air cylinder to allow control of the waste feed rate, in order to secure the most efficient combustion in incinerator 2 and after burner and combustion chamber 5. Other equivalent means of supplying the desired amount of solid wastes to the incinerator may be used if desired.

Incinerator 2 has a structural steel supporting frame and refractory brick lining, walls, baffles, hearth and flues. The solid waste is burned on the incinerator grate, preferably an inclined jet pulse air firing system grate, although conventional incinerator grates may be used.

In the jet pulse air firing system, refractory bricks are arranged in rows of steps to provide an inclined hearth 7. Some or all of the refractory bricks have venturi shaped holes or openings connected to an air feed line 8, with solenoid valves 9 in the individual feed lines to each hole or opening for controlling the flow of compressed air thereto. The venturi shaped nozzles may have the configuration shown in FIG. 4, described hereinafter.

Each refractory brick in each row may have a venturi hole or opening, or the refractory brick having nozzles therein may be spaced with plain bricks in the pattern best suited for the material being burned on the inclined grate. The solenoid valves 9 in each individual venturi nozzle feed line 8 are actuated by a timer (not shown) in a planned sequence, starting with the top step or row of nozzles and proceeding to the bottom step or row of nozzles, with the timing cycle varied to provide the best air flow for the material being burned (it will be readily appreciated that this provides air to the bottom of the burning bed of solid waste, with this technique generally called underfiring as opposed to the overfiring technique of introducing air required for combustion at a level above the burning bed). When each solenoid valve 9 is opened, it allows a jet blast of compressed air to escape through its associated venturi nozzle. The air blast expands and moves the burning bed 6 forward, with the burning material progressing down the steps of the grate until combustion is complete. The force of the jet air blast agitates the burning bed and the air pressure is chosen at such a level that the air is forced through the bed into the burning zone. This bed agitation and penetration provides efficient burning of the material being fired in incinerator 2.

Maintenance and repairs of this jet pulse air firing system grate are low, as the grates have no moving or metal parts exposed to combustion heat. Associated equipment for the jet pulse air firing system includes an air compressor 11, air reservoir tank 12, air piping system and header pipes 10 for supplying jet pulse air to the inclined grate venturi port and also to the overgrate air supply ports.

The non-combustible solid waste residue passing down incline grate 7 is dropped into a quench tank (shown in FIG. 3 and described hereinafter) in area 13.

Water borne sanitary waste is collected from residential, commercial and/or industrial sources and flows by conventional pipe line 14 to pumping station 15. Pumping station 15 includes a coarse screen well 16 with a coarse bar rack screen 17 and a sewage solids grinder 18 for reducing large particles to a relatively uniform small size. The sanitary waste flow to a wet well 19 and is pumped by pump 20, located in a dry well, to incinerator 2 or to an emergency storage tank 21 if incinerator 2 is not in operation. When incinerator plant 2 returns to operation, the sanitary waste in emergency storage tank 21 is returned to wet well 19. The sanitary waste in wet well 19 is pumped by pump 20 through line 19a to vibrating screen 22, having an appropriately sized screen deck, e.g., of 80 mesh. Material remaining on the screen deck flows by gravity to feed hopper 23 and then into incinerator 2 by way of line 24. Air blower 25 blows a stream of air into feed hopper 23, forcing the oversized material in hopper 23 through line 24 and to the incinerator grate. This air stream also seals line 24 against the escape of hot gases from incinerator 2, and provides overfiring or overgrate air for the combustion of the solid waste material.

The water and other material passing through screen deck 22 flows to surge tank 26 and then is pumped by pump 27 through line 28 to mixing and supply tank 29.

The amount of water in the sanitary waste is generally not sufficient to supply the desired 100 gallons per capita per day of drinking water, and the difference may be supplied through conventional water treatment plants, or an additional amount of impure make-up water may be treated in the process of the present invention. The makeup water may be sea water, brackish bay water, contaminated surface water from rivers, streams or lakes, or well water having high solids content or the like. A source of makeup water 30 supplies such water to a pumping station 31 located at the water supply source. Pumping station 31 includes a coarse bar rack screen 32 for protecting the pumping system against large floating objects. A fine mesh traveling intake screen 33 removes smaller material from the water, which is then pumped, at a rate of about 20 gallons per capita per day, by pump 34 through line 35 to mixing and supply tank 29.

The water in mixing and supply tank 29 is pumped by pump 36 through line 37 to heat exchanger 38. In the heat exchanger approximately one-third of the flow introduced through line 37 is evaporated by the condensation of water vapor and the cooling of hot gases from the incinerator. About one-third of the water supplied through line 37, containing suspended and dissolved solids, is collected in the heat exchanger sump 39. Mixer 39a in sump 39 agitates solids and prevents the settling of solids. Material in heat exchanger sump 39 is pumped by pump 40 through line 41 to atomizing nozzle 42, wherein the water-solids mixture is ejected into the hot gases from incinerator 2 at venturi throat 43 of spray dryer 44. The atomized water droplets and the hot gases are intimately mixed in venturi throat 43.

The hot gases from the combustion of solid wastes on inclined grate 7 in incinerator 2 pass into afterburner and combustion chamber 5. Air blower 45 mounted on top of the incinerator supplies excess air, in the proper amount to combustion chamber 5. Natural gas fired burners 46 mounted on each side wall of combustion chamber 5 supply sufficient heat to the hot gases passing through afterburner and combustion chamber 5 to evaporate any water entrained therein. It will be appreciated, of course, that electric heating elements or other heating means may replace the gas burners 46.

In spray dryer 44 the water in the sanitary waste slurry which has passed through heat exchanger 38, and has been atomized through atomizer nozzle 42 in venturi throat 43 is vaporized by direct heat exchange with the heated air coming from afterburner and combustion chamber 5. Most of the solids in the sanitary waste/contaminated water slurry introduced through atomizing nozzle 42 fall to the bottom of spray dryer 44. The solids are collected in a hopper, from which they are discharged by screw conveyer 47 to bucket elevator 48 to storage bin 49, where the solids are held for shipment to solid waste disposal, e.g., to a land fill or to a plant for recovery of sodium chloride.

The gases coming from afterburner and combustion chamber 5 through spray dryer 44 are cooled by contact with the atomized slurry introduced through atomizing nozzle 42. The cooled gases leave spray dryer 44 and pass through multi-tube bag filters in dust bag collector 50. In dust bag collector 50, substantially all of entrained particulate matter in the gas stream is discharged. Dust bag collector 50 generally removes at least 95 percent of such particles, generally about 99 percent or so of such particles. The particles so removed are discharged to storage bin 49 where they are held for shipment.

The gases passing from the spray dryer 44 through dust bag collector 50 are pulled by exhaust fan 51, which discharges the gases, generally containing a high water vapor content, to heat exchanger 38. Saturated gases pass through heat exchanger 38 and are cooled, with water condensation, in the heat exchanger. The gases release at least a portion of their latent heat to evaporate a portion of the mixed sanitary waste/contaminated water mixture from mixing and supply tank 29. The condensed water is collected in air separator chamber 53 and passed to seal tank 54. From seal tank 54, the condensed water flows through aerator 59, wherein it is aerated and cooled to about atmospheric temperature, or about the temperature of the city water supply, e.g., 60°–70°F, and then passed into clean water holding tank 60. Pump 61 withdraws the water from tank 60 and delivers it to the city water supply system.

Vapors passing through heat exchanger 38 and airwater separator 53 (e.g., an expansion box) pass through a mist eliminator 55 (which may be wire mesh baffles or the like) and are exhausted to the atmosphere through exhaust stack 56.

Water which is evaporated from the slurry introduced into heat exchanger 38 from mixing and supply tank 29, is withdrawn from heat exchanger 38 by air compressor 57, where the water vapors are compressed to the saturation temperature and discharged to the hot side of the heat exchanger, wherein the water vapors are mixed with the hot gases passing through exhaust fan 51. The water vapors passing through air compressor 57 are also condensed in heat exchanger 38 and flow to seal tank 54 and clean water holding tank 60. That is, all water condensed in heat exchanger 38 flows through seal tank 54 and to clean water holding tank 60.

Figure 3:
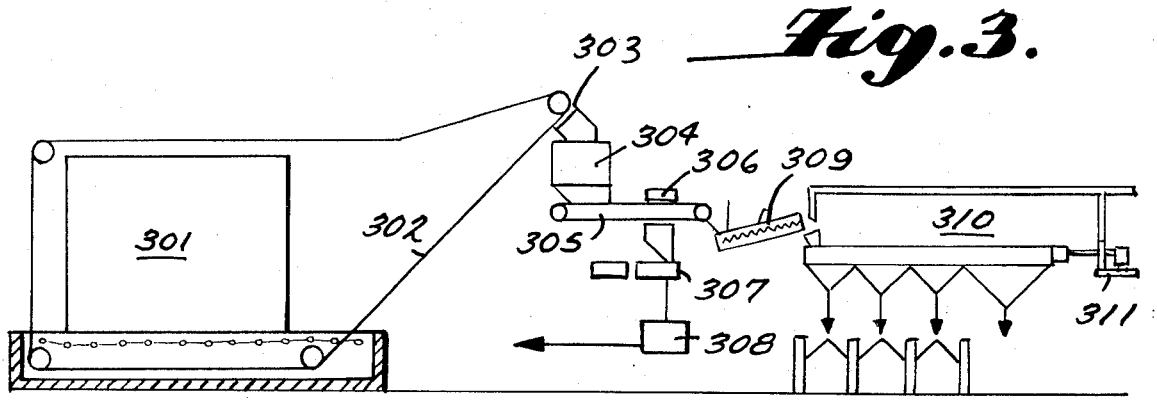
FIG. 3 is a schematic process diagram of the quench tank and associated solid waste treatment apparatus of the present application.

FIG. 3 is a schematic process diagram of the apparatus of the present invention for quenching the solids discharged from the incinerator and separating and recovering the quenched solid residue. The solids discharged from inclined grate 7 of incinerator 2 of FIG. 2 are passed into quench tank 301 to cool the non-combustible solid waste residues. The heat in the solid waste residues is recovered by the water in quench tank 301 with evaporated vapors carried off in the incinerator hot gas stream for subsequent recovery in heat exchanger 38 of FIG. 2. Residue conveyer 302 removes quenches solid residue from quench tank 301 and conveys the residues to the residue recovery system.

A bar screen 303 in the bed of conveyer 302 separates oversize pieces (generally pieces greater than 6 inches in diameter), and the oversize pieces so separated are collected and hauled to a land fill. The undersized material passing through bar screen 303 falls into crusher 304, wherein the material is crushed into pieces generally smaller than ½ inches maximum average diameter, generally about ⅛ inches maximum diameter. The crushed material from crusher 304 is conveyed by belt conveyer 305 past magnetic separator 306, which removes ferromagnetic materials, which fall through a chute to baling press 307. Baling press 307 compacts the iron pieces into a bale suitable for charging into an electric steel furnace, and discharges the bales to storage facilities 308 for subsequent shipment to a steel mill or the like. The non-magnetic material is discharged from belt conveyer 305 to log washer 309, wherein slag and ash are removed from the glass fraction of the residue. The scrubbed material passing through log washer 309 is discharged into hydraulic classifier 310, wherein the glass fraction of the residue is separated into fine and coarse material for use in road fill and concrete aggregate and the like. Fine sand, ash and clay are discharged to land fill. The overflow water from hydraulic classifier 310 flows to a sump or surge tank (not shown) and then is returned to quench tank 301 or hydraulic classifier 310 by pump 311.

Figure 4:
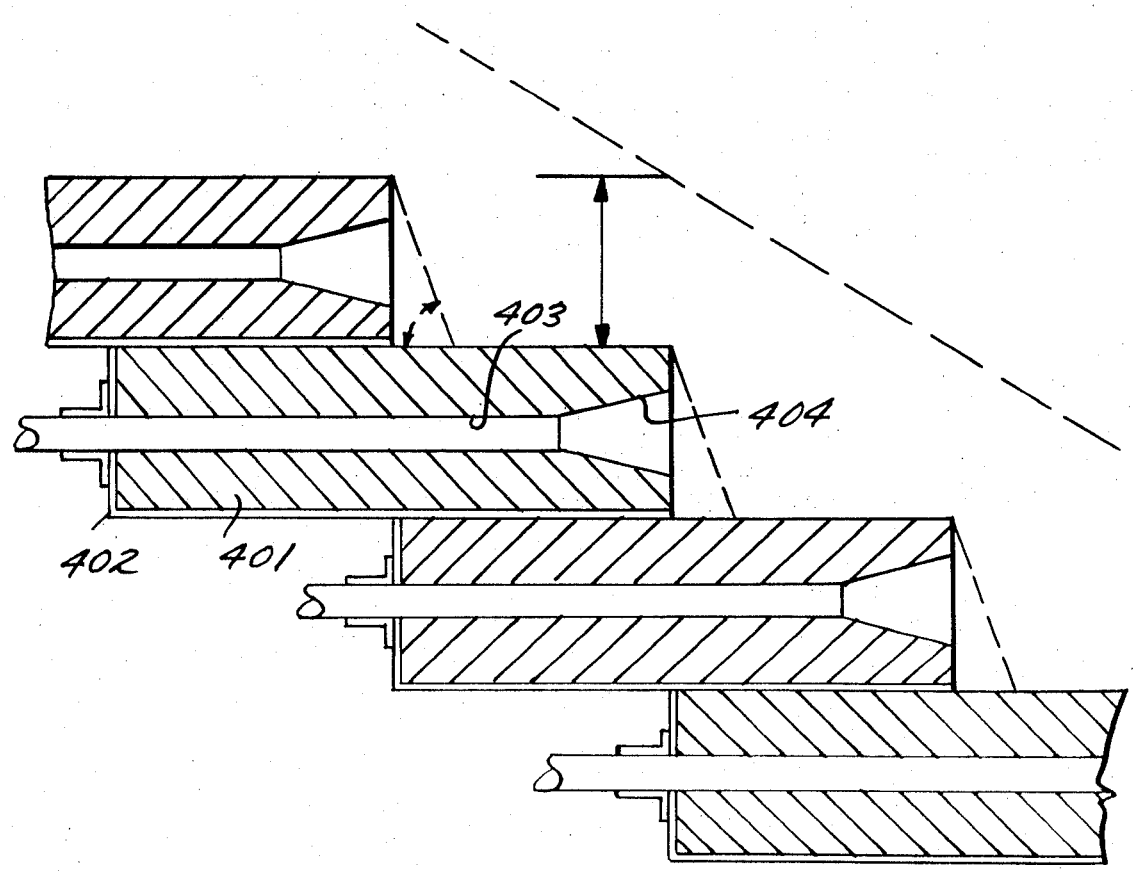
FIG. 4 is a cross-sectional view of a portion of the incinerator hearth with a jet pulse air firing system.

FIG. 4 is a cross-sectional view of the preferred incinerator hearth, illustrating the novel jet pulse firing system. The hearth is made of refractory brick 401, with the brick enclosed by 12 gauge metal 402 on four sides. Each or only a portion of the refractory bricks 401 have a bore or passageway 403 through the length of the brick. The end of bore 403 which is interior the incinerator has an expanded nozzle or venturi 404 although straight bores (with no venturi) may be used if desired. Each refractory brick in each row of the incinerator hearth may contain a venturi opening with associated bore, or the bricks containing the bores and venturis may be spaced with plain brick in a pattern which is best suited for the particular material being incinerated on the grate. The rows of refractory brick are arranged in step-wise fashion to provide an inclined hearth, with the angle of inclination of the hearth varying according to the angle of repose of the solid waste which is to be incinerated and the designed depth of the bed of solid waste. conveniently, each horizontal row of venturis is supplied with compressed air, with the air controlled by solenoid valves in the air control line. The solenoid valves are actuated by a timer in a planned sequence, starting with the top step of the inclined hearth and proceeding to the bottom step. It will be readily appreciated that the jet pulse air firing system of the present invention involves no moving parts exposed to the high temperature inside the incinerator. Another decided advantage of the present invention is that corrosion of the incinerator hearth is at most minimal. Yet another significant advantage of the jet pulse firing system is the ready control of the amount of underfiring of the solid waste residue.

EXAMPLE OF THE INVENTION

The invention will be understood more readily by reference to the following example; however, this example is intended to illustrate the invention and is not to be construed to limit the scope of the invention.

The following example relates to use of the process and apparatus of the present invention for treating solid wastes and liquid wastes and recovering potable water therefrom for a community having a population of 1,000 persons. The plant described in this example was according to the accompanying drawings and was based on the national average clean water usage of 100 gallons per capita per day, the national average liquid sanitary waste production of 80 gallons per capita per day, and the national average solid waste production of 5 lbs. per capita per day. The solid wastes were collected from domestic, commercial and industrial sources and include paper, cartons, rags, wood scraps, floor sweepings, garbage and the like, containing about 65 percent combustible material, 10 percent non-combustible material, and about 25 percent water. The liquid sanitary wastes, collected from domestic, commercial and industrial sources, contain about 1,500 ppm of total solids, of which about 820 ppm are volatile solids. The make-up water used was brackish salt water containing about 30,000 ppm of dissolved solids, mainly sodium chloride. The solid wastes, which averaged about 208 lbs per hour, were incinerated using 2,028 lbs per hous of air at a 60/40 overfire/underfire ratio, using the jet air pulse grate of FIG. 4 of the accompanying drawings. The incinerator had a primary incinerator chamber of about 21 cubic feet and a secondary chamber, or after-burner chamber of about 14 cubic feet.

The water-borne sanitary wastes amounted to an average of 3,333 gallons per hour, (amounting to about 27,800 lbs per hour). This was mixed with about 7,000 lbs per hour of make-up water, used for cooling the combustion gases in the heat exchanger, as described hereinafter, and atomized into the combustion gases (having a temperature of then 1,400°F) leaving the incinerator. This amount of atomized liquids cooled the combustion gases to about 300°F. After passing through a spray dryer and bag dust collector, wherein essentially all entrained solid particles were removed, the combustion gases (containing the atomized liquid therein) were passed through an indirect heat exchanger, (the gases were cooled by the exchange of heat with the mixture of sanitary wastes and make-up water, described above, which had a temperature of about 300°F) with the gases discharged from the heat exchanger having a temperature of about 90°F. Condensed water was removed from the gases passing through the heat exchanger, cooled to about atmospheric temperature, aerated to an oxygen content of about 10 ppm, and introduced into the city water supply system.

What is claimed is:

1. A process for disposing of daily requirements of liquid sanitary wastes, with recovery of clean potable water therefrom, and for disposing of daily requirements of solid wastes, said process consisting essentially of incinerating the solid wastes at a temperature of about 1,300°F to about 2,000°F to produce combustion gases and a solid, substantially non-combustible residue, thereafter atomizing aqueous liquid into said combustion gases to lower the temperature thereof to about 275°F to about 350°F, removing entrained solids from the cooled combustion gases, thereafter cooling the resulting gas stream by indirect heat exchange with liquid sanitary wastes to a temperature of 70°–180°F to condense water vapor in said gases, the liquid sanitary wastes from the indirect heat exchange being the aqueous liquid which is atomized into the combustion gases, thereafter separating condensed water from the remainder of the gases and discharging the gases, cooling the condensed water to a temperature of less than about 90°F, to produce clean potable water.

2. Process according to claim 1, wherein up to 500 percent by weight of coal is added to said solid wastes prior to incineration.

3. Process according to claim 1, wherein said solid wastes are incinerated on an air jet pulse grate.

4. Process according to claim 3, wherein said incineration is with about a 60/40 overfire/underfire air ratio.

5. Process according to claim 3, wherein said incineration temperature is about 1,400°F.

6. Process according to claim 1, wherein the incinerator combustion gases are cooled to a temperature of about 300°F by atomizing said aqueous liquid therein.

7. Process according to claim 1, wherein the liquid sanitary wastes used in said indirect heat exchange contain up to 25 percent by weight of make-up water.

8. Process according to claim 1, wherein water vapors which are evaporated from said liquid sanitary wastes during said indirect heat exchange are introduced into the combustion gas stream prior to said indirect heat exchange.

9. Process according to claim 1, wherein the water condensed in said indirect heat exchange is aerated and then introduced into a city water supply system.

10. Process according to claim 1, wherein the solid residues produced in the incinerator are quenched to a temperature below 212°F.

11. Process according to claim 10, wherein the quenched solid residue is separated into a plurality of fractions by magnetic separation and/or hydraulic classification.

12. Process according to claim 1, wherein the gases discharged from the indirect heat exchange are at a temperature of about 90°F.

13. Process according to claim 1, wherein about 100–125 gallons of clean potable water are produced for each 5–12 pounds of solid wastes.

14. Process according to claim 13, wherein about 100 gallons of clean potable water are produced per 5 pounds of solid wastes which are incinerated.

* * * * *